(12) United States Patent
Ahnert et al.

(10) Patent No.: US 10,167,040 B2
(45) Date of Patent: Jan. 1, 2019

(54) BICYCLE SUSPENSION STEM WITH INTEGRATED PIVOT

(71) Applicant: REDSHIFT SPORTS LLC, Philadelphia, PA (US)

(72) Inventors: Stephen Dewei Ahnert, New York, NY (US); Erik Teig De Brun, Philadelphia, PA (US); Scott David Poff, Philadelphia, PA (US)

(73) Assignee: Redshift Sports LLC, Philadelphia, PA (US)

( * ) Notice: Subject to any disclaimer, the term of this patent is extended or adjusted under 35 U.S.C. 154(b) by 0 days.

(21) Appl. No.: 15/235,304

(22) Filed: Aug. 12, 2016

(65) Prior Publication Data

US 2017/0043838 A1 Feb. 16, 2017

Related U.S. Application Data

(60) Provisional application No. 62/204,626, filed on Aug. 13, 2015.

(51) Int. Cl.
*B62K 21/16* (2006.01)
*B62K 21/14* (2006.01)

(52) U.S. Cl.
CPC .............. *B62K 21/14* (2013.01); *B62K 21/16* (2013.01)

(58) Field of Classification Search
CPC ................................ B62K 21/14; B62K 21/16
See application file for complete search history.

(56) References Cited

U.S. PATENT DOCUMENTS

| 1,060,442 | A | | 4/1913 | Erickson |
| 1,616,021 | A | | 2/1927 | Arzens |
| 2,294,839 | A | | 9/1942 | Duffy |
| 4,939,950 | A | | 7/1990 | Girvin |
| 5,181,436 | A | | 1/1993 | Lai |
| 5,186,074 | A | | 2/1993 | Arnold |
| 5,220,851 | A | | 6/1993 | Flechel |
| 5,241,881 | A | | 9/1993 | Chen |
| 5,467,665 | A | | 11/1995 | Huang |
| 5,511,444 | A | | 4/1996 | Clausen et al. |
| 5,660,406 | A | | 8/1997 | Menze |
| 5,678,457 | A | | 10/1997 | Hals |
| 5,842,385 | A | * | 12/1998 | Su ........................ B62K 21/16 280/279 |

(Continued)

FOREIGN PATENT DOCUMENTS

| CN | 2288132 Y | 8/1998 | |
| DE | 9314493 U1 * | 11/1993 | ............. B62K 21/14 |

(Continued)

*Primary Examiner* — Vicky A Johnson
(74) *Attorney, Agent, or Firm* — Gordon Rees Scully Mansukhani, LLP (57) ABSTRACT

A bicycle suspension stem with an integrated pivot between a static part and a suspended part to provide vibration and impact absorption is provided. A bicycle stem includes a static part configured to connect to a steerer of a bicycle fork, the static part comprising a protrusion, a suspended part rotatably connected to the static part and configured to connect to a handlebar, and a biasing member disposed between the protrusion and an inside surface of the suspended part to resist rotation of the suspended part about the axis of rotation.

15 Claims, 10 Drawing Sheets

(56) References Cited

U.S. PATENT DOCUMENTS

| | | | |
|---|---|---|---|
| 7,437,970 B2 * | 10/2008 | Chen | B62K 21/16 74/551.8 |
| 7,500,415 B2 * | 3/2009 | Thomson | B62K 19/36 280/279 |
| 2009/0079160 A1 * | 3/2009 | Lai | B62K 21/16 280/279 |
| 2014/0116195 A1 | 5/2014 | Gu | |
| 2015/0059518 A1 | 3/2015 | Feng et al. | |

FOREIGN PATENT DOCUMENTS

| | | | |
|---|---|---|---|
| DE | 4320665 A1 * | 1/1995 | B62K 21/14 |
| DE | 29917301 U1 * | 12/1999 | B62K 21/16 |
| FR | 2695371 A1 * | 3/1994 | B62K 21/14 |

* cited by examiner

BICYCLE SUSPENSION STEM WITH INTEGRATED PIVOT

BACKGROUND

The present invention generally relates to bicycle suspension stems and, more particularly, to a bicycle suspension stem with an integrated pivot between a static part and a suspended part to provide vibration and impact absorption.

Unsuspended vehicles provide for uncomfortable rides. For example, a fully rigid bicycle transfers the roughness of the travelling surface to the rider via contact points between the rider and the bicycle. Vibrations and impacts are generally transferred to a rider's hands via a handlebar, feet via pedals, and posterior via a saddle. Vibrations and impacts can cause fatigue, soreness, and/or injury, ultimately leading to decreased performance ability of the rider.

Various constructions for suspension systems provide relief from such vibrations and impacts. Suspension forks and frames are often implemented in mountain bicycles. These suspension systems are too heavy and too inefficient to implement in road bikes, which are desired to be light and stiff. As such, most road bicycles remain fully rigid thereby providing decreased ride quality and comfort.

SUMMARY

In aspects of the invention, a bicycle stem with a shock absorber, the bicycle stem being mountable between a steerer tube of a fork and a handlebar to secure the handlebar to a bicycle, includes a static part configured to connect to a steerer of a bicycle fork, the static part comprising a protrusion, a suspended part rotatably connected to the static part and configured to connect to a handlebar, and a biasing member disposed between the protrusion and an inside surface of the suspended part to resist rotation of the suspended part about the axis of rotation.

In an aspect of the invention, a bicycle stem with a shock absorber, the bicycle stem being mountable between a steerer tube of a fork and a handlebar to secure the handlebar to a bicycle, includes a static part configured to connect to a steerer of a bicycle fork, the static part comprising a protrusion; a suspended part rotatably connected by a single pivot to the static part and configured to connect to a handlebar, the single pivot being between the connection to the handlebar and the connection of the static part to the steerer, and a biasing member disposed between the pivot and the connection to the handlebar.

In an aspect of the invention, a bicycle stem with a shock absorber, the bicycle stem being mountable between a steerer tube of a fork and a handlebar to secure the handlebar to a bicycle, includes a static part configured to connect to a steerer of a bicycle fork, the static part comprising a protrusion, and a suspended part rotatably connected by a single pivot to the static part and configured to connect to a handlebar, the single pivot and the protrusion being enclosed in the suspended part.

BRIEF DESCRIPTION OF THE DRAWINGS

The present invention is described in the detailed description that follows, in reference to the noted plurality of drawings by way of non-limiting examples of exemplary embodiments of the present invention.

DETAILED DESCRIPTION

The present invention generally relates to bicycle suspension stems and, more particularly, to a bicycle suspension stem with an integrated pivot between a static part and a suspended part to provide vibration and impact absorption. Aspects of the invention provide a suspension stem having a form similar to a typical rigid, i.e., non-suspended, threadless bicycle stem, the form being provided by the suspension pivot disposed between the ends of the suspension stem and at least one biasing member disposed within the suspension stem between the suspension pivot and a handlebar end of the suspension stem. The at least one biasing member is compressed or expanded between a suspended part and a static part to resist rotation of the suspended part with respect to the static part. The biasing member may be held in place by friction and/or preloading of the biasing member by a wedge.

The suspension stem according to aspects of the invention includes a single pivot about which the suspended part is rotatable, the single pivot being closer to a connection between the static portion and the steerer of the fork of the bicycle, which decreases the extent of angular rotation of the handlebars upon absorption of vibrations and/or impacts. For example, the axis of the single pivot may be closer to the connection with the steerer than halfway between the connection with the handlebar and the connection with the steerer. The single pivot is disposed such that the axis of rotation of the steerer and the axis of rotation of the pivot are separate. The suspended part may enclose the biasing member and/or the pivot to protect from debris, contamination, and/or sunlight, which extends life of the components and elastomers. The simple, low-maintenance suspension stem according to aspects of the invention provides for comfortable absorption of vibrations and/or impacts, resulting in improved performance and comfort of the rider.

Figure 1:
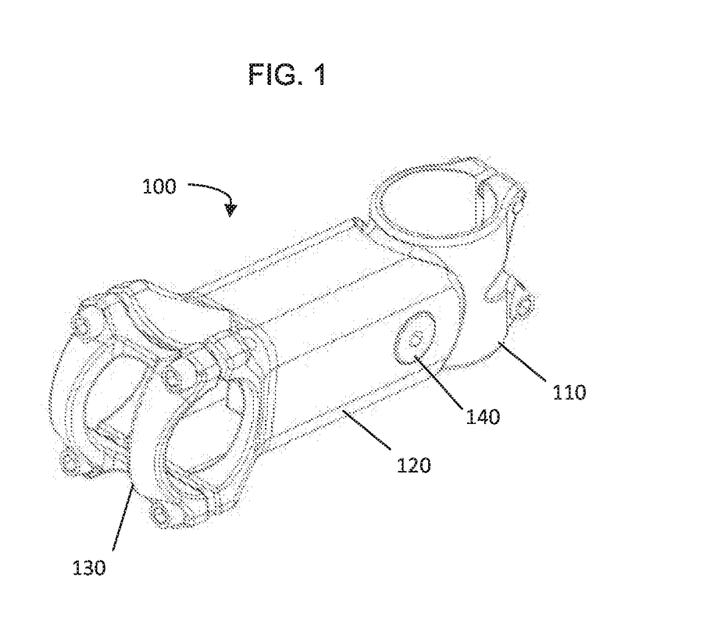
FIG. 1 shows a perspective view of a suspension stem according to aspects of the invention.
Figure 2:
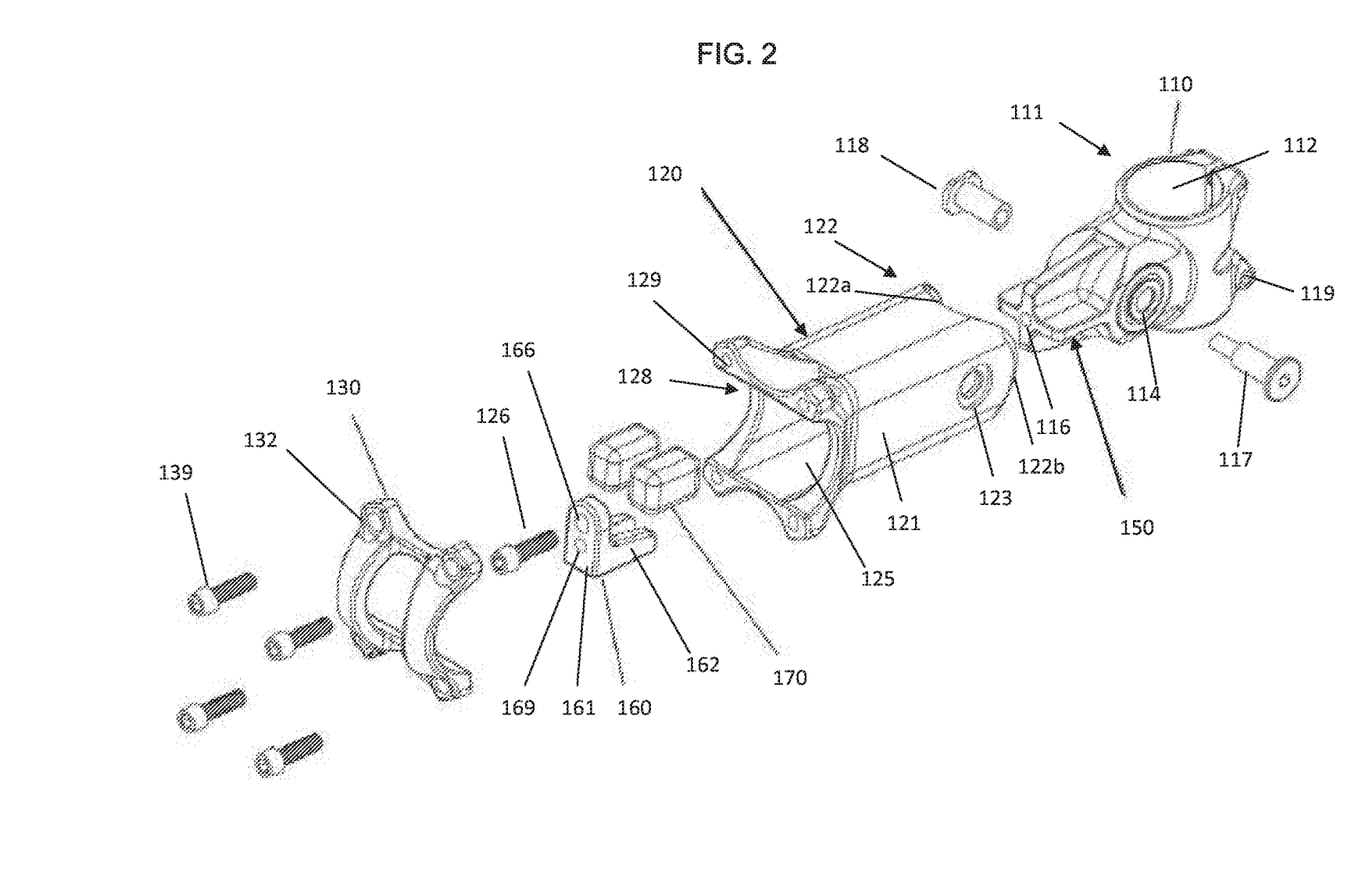
FIG. 2 shows an exploded perspective view of the suspension stem of FIG. 1.

FIG. 1 shows a perspective view of a suspension stem according to aspects of the invention. FIG. 2 shows an exploded perspective view of the suspension stem of FIG. 1. The suspension stem 100 includes a static part 110, a suspended part 120 rotatably secured to the static part at a suspension pivot 140, and a faceplate 130. The static part 110 is configured to connect to a steerer of a fork of a bicycle. The suspended part 120 and the faceplate 130 are configured to securely hold a handlebar. And, the suspension stem 100 may be of various lengths, for example, 50 mm to 130 mm.

The suspension stem 100 according to aspects of the invention includes a single suspension pivot 140. The suspension pivot 140 is disposed between the connection of the static part 110 and the steerer of the fork and the connection between the suspended part 120 and the handlebar via the faceplate 130. The single pivot 140 may be disposed closer to the connection of the static part 110 and the steerer of the fork than the connection between the suspended part 120 and the handlebar. For example, the pivot 140 may be provided closer to the connection of the static part 110 and the steerer than halfway between the connection portion 111 of the static part 110 and the faceplate end 128 of the suspended part 120 and may be disposed close to the connection portion 111 of the static part 110. Such location of the pivot 140 provides for increased comfort due to an increased radius of rotation relative to other locations of the pivot 140 between the ends of the suspension stem 100. An axis of rotation of the pivot 140 is perpendicular to an axis of rotation of the steerer of the fork and parallel to a portion of the handlebar secured by the suspended part 120 and the faceplate 130. The axis of rotation of the pivot 140 is also parallel to the axis of rotation of the front wheel disposed in the fork. The pivot 140 limits the movement of the suspended part 120 to movement only about the axis of rotation of the pivot 140. The pivot 140 may be partially or fully enclosed in the suspended part 120 as described herein.

The suspended part 120 and the faceplate 130 may be secured together via 1, 2, 3, 4, or more fasteners, for example standard screws or the like, to hold a handlebar of standard or custom dimensions without movement with respect to the suspended part 120. For example, the suspended part 120 and the faceplate 130 may be configured to secure a handlebar having a 1 inch, 1.125 inch, 1.25 inch, 1.5 inch, etc., diameter. Although shown in FIG. 1 as separate, the suspended part 120 and the faceplate 130 may be integrated as a single piece. The shape of the faceplate 130 is not limited except to the extent necessary to accommodate a handlebar as described herein. For example, FIG. 1 shows the faceplate 130 as having an aperture disposed therein but such aperture need not be included and the faceplate 130 may be a solid piece.

FIG. 2 shows an exploded perspective view of the suspension stem of FIG. 1. The suspension stem 100 includes the static part 110, the suspended part 120 rotatably secured to the static part at the suspension pivot 140, and the faceplate 130.

The static part 110 includes a connection portion 111 and a protrusion portion 150. The connection portion 111 includes an opening 112 and at least one fastener 119. The protrusion portion 150 includes a rotation member 114 aligned with the pivot 140 and tapped hole 116.

The connection portion 111 of the static part 110 connects to the steerer of the fork via the opening 112 and the at least one fastener 119 to tighten the opening 112 and to secure the static part 110 to the steerer. The connection portion 111 and the opening 112 may be such that the connection of the static part 110 of the suspension stem 100 to the steerer of the fork may be any of standard and custom connections between a stem and a steerer. For example, the opening 112 of the static part 110 may have a diameter appropriate to be secured to a 1 inch, 1.125 inch, 1.5 inch, etc., steerer of a fork, and may be securely clamped thereto via 1, 2, 3, 4, or more fasteners, for example, standard screws or the like. As shown in FIG. 2, the at least one fastener 119 is provided to secure the static part 110 to the steerer of a fork. However, aspects need not be limited thereto such that aspects of the invention may be applied to other types of stems and connections to forks, for example, the connection portion 111 may be implemented as a quill stem connection to a fork. If implemented in a quill stem configuration, the pivot 140 is disposed between an axis of rotation of the steerer of the fork and the connection of the suspended part 120 and the faceplate 130.

The protrusion portion 150 of the static part 110 extends from connection portion 111 in a long axis direction. The long axis direction of the protrusion portion 150 may be perpendicular to an axis of rotation of the steerer of the fork or may form an angle with the direction perpendicular to the axis of rotation of the steerer of the fork. For example, the angle formed between the long axis direction of the protrusion portion 150 and the direction perpendicular to the axis of rotation of the steerer of the fork may be, for example, 0° to very close to 90°. In embodiments, the protrusion portion 150 may be adjustable such that the angle formed between the long axis direction of the protrusion portion 150 and the direction perpendicular to the axis of rotation of the steerer of the fork may be changed or changeable. Such adjustable offset angle of the suspended part 120 may provide increased comfort to a rider and a better fit geometry.

The protrusion portion 150 includes a throughhole in which at least one rotation member 114 is disposed and at least partially through which fasteners 117 and 118 extend. The throughhole of the protrusion portion 150 of the static part 110, along with the at least one rotation member 114 and the fasteners 117 and 118, implement the pivot 140 with respect to the static part 110 and the connection between the suspended part 120 and the static part 110.

The at least one rotation member 114 is illustrated as sealed ball bearings or a cartridge bearing pressed into the throughhole of the protrusion portion 150. However, according to embodiments, the at least one rotation member 114 may be bearings in a cup and cone implementation or may be a bushing to facilitate rotation of the suspended part 120 about the axis of rotation of the pivot 140. For example, the at least one rotation member may be two sealed ball bearings having a spacer disposed therebetween pressed into the throughhole of the protrusion portion 150. In embodiments, at least one rotation member 114 need not be included such that the suspended part 120 rotates about the pivot 140 on the fasteners 117 and 118. The pivot 140 may be partially or fully enclosed in the suspended part 120. For example, the at least one rotation member 114 and the throughhole of the protrusion portion 150 are completely enclosed in the suspended part 120 while the fasteners 117 and 118 are illustrated to extend through the sides of the suspended part 120 to be exposed. However, aspects need not be limited thereto such that the fasteners 117 and 118 may also be fully enclosed.

The protrusion portion 150 includes a tapped hole 116 disposed in an end of the protrusion portion 150 disposed away from the connection portion 111. The tapped hole 116 accepts a fastener 126 to secure a wedge 160 to the protrusion portion 150. The wedge 160 may secure or preload one or more biasing members 170 between the protrusion portion 150 and the suspended part 120 as described herein.

The suspended part 120 includes a body 121, a curved end 122 adjacent to the static part 110, one or more throughholes 123 aligned with the pivot 140, an inner surface 125, a faceplate end 128, and at least one tapped hole 129. The body 121 may have a shape and dimensions similar to those of conventional stems. For example, the body 121 may have a generally tubular shape configured at the curved end 122 to connect to the static part 110 at the pivot 140 and configured at another end to connect to the faceplate 130. As shown in FIG. 2, the body 121 of the suspended part 120 may have a generally rectangular or square cross-section with rounded corners, the cross-section being transverse to a long axis of the suspended part 120. In embodiments, the body 121 of the suspended part 120 may have one or more of other cross-sectional shapes, for example, round, partially round, hexagonal, etc.

The body 121 extends between a curved end 122 disposed adjacent to the static part 110 and the faceplate end 128 connectable to the faceplate 130. The pivot 140 is disposed at the curved end 122 of the body 121. The curved end 122 includes a first curve 122a and a second curve 122b, the first curve 122a and the second curve 122b extending beyond the pivot 140. The first curve 122a may be formed at top and bottom sides of the body 121 and the second curve 122b may be formed at sides of the body 121 where the top and bottom sides of the body 121 have lengths that extend parallel to the axis of rotation of the pivot 140, and the sides of the body 121 have lengths perpendicular to the axis of rotation of the pivot 140. The curves 122a may have a shape complementary to the static part 110. For example, the curves 122a may curve to follow generally the opening 112 of the static part 110. When the body 121 of the suspended part 120 is installed on the static part 110 and in a neutral position, the top curve 122a may contact the static part 110 to prevent rotation about the pivot 140 in the direction of the top of the body 121. And, when the body 121 of the suspended part 120 is installed on the static part 110 and in a rotated state, the bottom curve 122a may contact the static part 110 to prevent rotation about the pivot 140 in the direction of the bottom of the body 121.

The curves 122b of the sides of the body 121 may curve in a direction opposite to the curves 122a. The curves 122b may be less curved than the curves 122a and need not be curves at all such that the shape thereof is not necessarily limited.

Although illustrated as having a curved end 122, the body 121 need not be limited thereto such that the end of the body 121 disposed adjacent to the static part 110 may be a straight end or a combination of curved and straight portions.

The sides of the body 121 include one or more throughholes 123 aligned with the pivot 140, for example, one throughhole 123 on each side of the body 121 in the curved end 122 of the suspended part 120. The throughholes 123 align with the throughhole of the static part 110 and the rotation member 114 disposed in the throughhole of the static part 110 to provide movement of the suspended part 120 about the axis of rotation of the pivot 140. The fastener 117 extends through the throughhole 123 on one side of the body 121 and through the rotation member 114 disposed in the throughhole of the static part 110 to connect to the fastener 118, which is similarly disposed through the throughhole 123 on the other side of the body 121 and through the rotation member 114 disposed in the throughhole of the static part 110. The fasteners 117 and 118 may securely connect the body 121 of the suspended part 120 and the static part 110 to limit movement of the suspended part 120 to about an axis of rotation of the pivot 140 with little or no lateral or other movement. In embodiments, the fasteners 117 and 118 may preload or load the rotation member 114 disposed in the static part 110. The fastener 118 may be shaped to include a nut to prevent rotation of the fastener 118 when inserted in a recess of the throughhole 123 on the side of the body 121.

The faceplate end 128 of the suspended part 120, opposite the curved end 122, is configured to connect to the faceplate 130. For example, the faceplate end 128 includes tapped holes 129 to engage fasteners 139, which extend through throughholes 132 of the faceplate 130, to secure the faceplate 130 to the faceplate end 128 of the suspended part 120. The faceplate 130 and the faceplate end 128 of the suspended part 120 secure a handlebar disposed therebetween for steering a bicycle during operation. The faceplate end 128 and the faceplate 130 are not limited and may be integral as one part.

The suspended part 120 includes an inner surface 125 of the body 121. The inner surface 125 provides a surface against which the biasing member 170 may be preloaded and against which the biasing member 170 may resist rotation of the suspended part 120 about the pivot 140. The wedge 160 and the surface 125 may interact to limit movement of the suspended part 120. For example, the wedge 160 may contact a bottom of the inner surface 125 to limit the rising of the suspended part 120.

The biasing member 170 is disposed between the protrusion portion 150 of the static part 110 and the inner surface 125 of the suspended part 120, and the wedge part 160 is secured to the protrusion portion 150. The wedge part 160 maintains the biasing member 170 in place between the protrusion portion 150 and the inner surface 125 of the suspended part 120 and/or preloads the biasing member 170 between the protrusion portion 150 and the inner surface 125 of the suspended part 120. The biasing member 170 may be at least one elastomeric part. For example, the biasing member 170 may include two elastomeric blocks having dimensions to fit between the protrusion portion 150 and the inner surface 125 of the body 121 of the suspended part 120. The biasing member 170 may include one or more elastomeric blocks having different stiffnesses, and/or the biasing member 170 may be easily changed to adjust stiffness and feel of the suspension of the suspension stem 100. In embodiments, the elastomeric blocks may be of an irregular shape such that, when disposed between the protrusion portion 150 and the inner surface 125 of the body 121 of the suspended part 120, the irregular shape of the elastomeric block provides a different usable volume thereby changing the effective stiffness of the rotation of the suspended part 120. In embodiments, the biasing member 170 may be any material or feature capable of providing a force that varies with displacement, including elastomers, for example, polyurethane elastomers, wire springs, magnets, pistons, air bladders, and the like.

The wedge part 160 includes a main portion 161 and a leg portion 162. The main portion 161 includes a throughhole 166 and a tapped hole 169. A fastener 126 extends through the throughhole 166 to engage with tapped hole 116 of the protrusion portion 150 to secure the wedge part 160 to the protrusion portion 150 and to secure the biasing member 170 in place between the protrusion portion 150 and the inner surface 125 of the body 121 of the suspended part 120. The tapped hole 169 accepts a screw to press against the end of the protrusion portion 150 so as to remove the wedge part 160 from the protrusion portion 150 after the fastener 126 has been removed from the tapped hole 116.

The leg portion 162 extends generally at a right angle from the main portion 161. The leg portion 162 may include one or more legs. For example, as shown in FIG. 2, the leg portion 162 may include two legs. The number of legs of the leg portion 162 may correspond to a number of biasing members 170. Each leg of the leg portion 162 may include an inclined portion to increase preload of the biasing member 170 against the top of the inner surface 125 of the body 121 by interaction of the leg portion 162 with a bottom of the inner surface 125 of the body 121 of the suspended part 120. The wedge 160 may limit rotation of the suspended part 120 through interaction with the bottom of the inner surface 125 of the body 121 of the suspended part 120. The leg portion 162 of the wedge 160 may include a groove to accept a portion of the protrusion portion 150 therein, for example a first extension as described with respect to FIG. 3. Although shown as including two legs in FIG. 2, the leg portion 162 may include only one leg according to embodiments, for example, to preload one or more biasing members 170.

The wedge part 160 may preload the biasing member 170 in at least one of a direction parallel to the long axis of the protrusion member 150 and in a direction of the rotation of the suspended part 120 about the pivot 140. For example, the wedge part 160 may preload the biasing member 170 by pressing the leg portion 162 against the bottom of the inner surface 125 of the body 121 to actuate the biasing member 170 between the static part 110 and the top of the inner surface 125 of the body 121 to partially compress the biasing member 170. The amount of preload provided by the wedge part 160 may be determined or changed according to a size of the leg portion 162 of the wedge part 160, for example, a larger leg part 162 may provide greater preload of the biasing member 170. The fastener 126 may provide the mechanical leverage to drive the leg portion 162 of the wedge part 160 against the bottom of the inner surface 125 of the body 121. Instead of a wedge part 160, a cam mechanism may be used to preload the biasing member 170.

The biasing member 170 may establish a neutral position of the suspended part 120 with respect to the static part 110 when no other forces are at work in the system. In the neutral position, the biasing member 170 is preloaded between the inner surface 125 of the body 121 of the suspended part 120 to rotate the suspended part 120 about the pivot 140 in the direction of the top of the body 121 and to resist rotation of the suspended part 120 about the pivot 140 in the direction of the bottom of the body 121. In the neutral position, at least one of the wedge 160 and the bottom of the inner surface 125 of the body 121, the protrusion portion 150 and the bottom of the inner surface 125 of the body 121, and the curved part 122a of the top of the body 121 and the static part 110 may interact to prevent further rotation of the suspended part 120 in the direction of the top of the body 121.

The suspended part 120 is rotatable about and may be rotated about the pivot 140 to compress the biasing member 170 to a rotated state. The rotated state may be one in which the rotation of the suspended part 120 about the pivot 140 in the direction of the bottom of the body 121 of the suspended part 120 is prevented by at least one of the biasing member 170 being fully actuated, interaction of the inner surface 125 of the top of the body 121 and the protrusion portion 150, and interaction of the curved part 122a of the bottom of the body 121 with the static part 110.

In embodiments, the rotation of the suspended part 120 may be locked or at least partially locked. For example, a bolt or device that interferes with the motion of the suspended part 120 relative to the static part 110 may be operable to lockout the movement of the suspended part 120. In embodiments, the position of the biasing member 170 may be adjusted to change the effective stiffness of the stem without disassembly. For example, a lever with a cam or a bolt with a locking feature may move or rotate the biasing member 170 into different orientations to provide different points of contact with the protrusion portion 150 of the static part 110 and the inner surface 125 of the body 121 of the suspended part 120.

Figure 3:
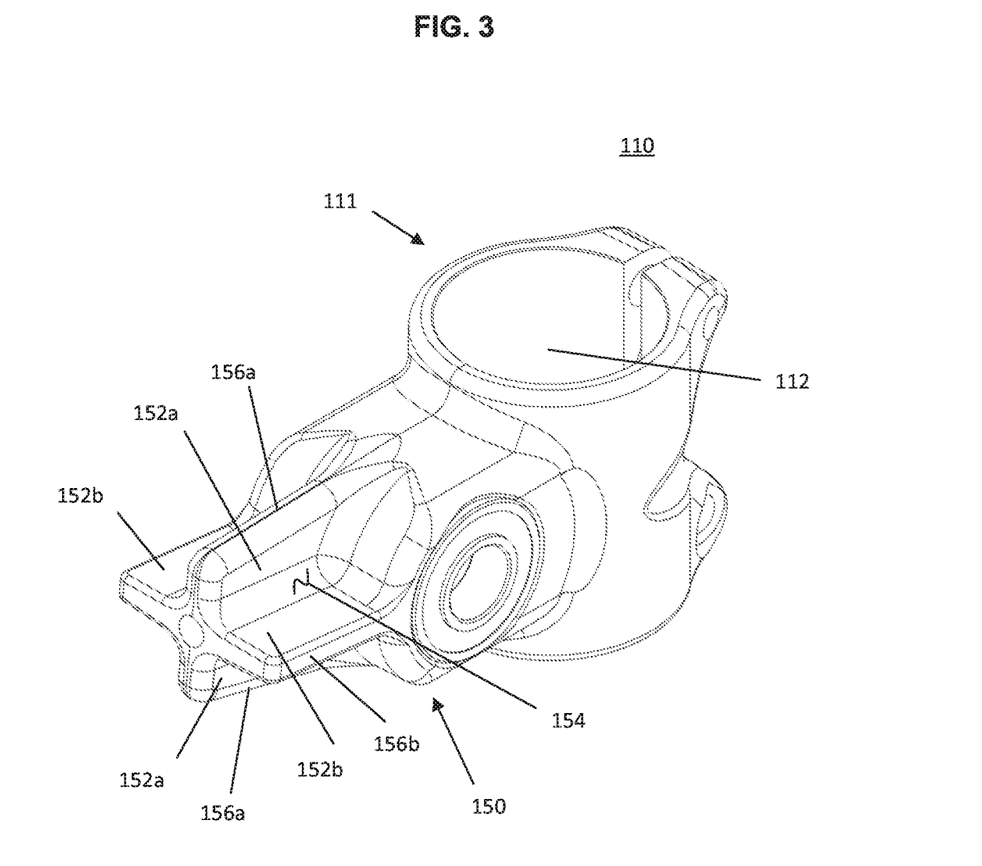
FIG. 3 shows a perspective view of a static part of a suspension stem according to aspects of the invention.

FIG. 3 shows a perspective view of a static part of a suspension stem according to aspects of the invention. Similar to described herein, the static part 110 includes the connection portion 111 and the protrusion portion 150. The static part 110 is the same as illustrated in FIG. 2 but is further shown and described in FIG. 3. Description of similar elements may not be repeated.

The protrusion portion 150 includes first extensions 152a and second extensions 152b. The first extensions 152a are generally planar and extend in the long axis direction of the protrusion portion 150 and perpendicular to the axis of rotation of the pivot 140. The second extensions 152b are generally planar and extend in the long axis direction of the protrusion portion 150 and parallel to the axis of rotation of the pivot 140. The first extensions 152a and the second extensions 152b meet such that the protrusion portion 150 has a generally elongated cross shape.

Adjacent first extensions 152a and second extensions 152b form spaces 154 in which biasing members 170 are disposable to resist and assist rotation of the suspended part 120. As shown in FIG. 3, the first extensions 152a and the second extensions 152b provide four spaces 154 for biasing members 170. In embodiments, biasing members 170 are disposed in the top spaces 154 while the bottom spaces 154 remain empty. In this configuration, the suspended part 120 is biased about the pivot 140 in a direction toward the top of the body 121 of the suspended part 120, and the biasing members 170 resist rotation about the pivot 140 in a direction toward the bottom of the body 121 of the suspended part 120. In embodiments, biasing members 170 of various qualities are disposed in each of the four spaces 154 to control, for example, preload, compression, damping, and/or rebound of the rotation of the suspended part 120 about the pivot 140.

The first extensions 152a and the second extensions 152b may be symmetric such that the static part 110 is reversible on the steerer of the fork to provide positive or negative rise of the stem. For example, if the static part 110 provides for a suspension stem 100 having a rise of +8°, the static part 110 may be installed upside down on the steerer of the fork such that the suspension stem 100 has a rise of −8°. The biasing members 170 would also be disposed in the top spaces 154 of the protrusion portion 150 to resist rotation of the body 121 of the suspended part 120 in a direction toward a bottom of the body 121. The pivot 140 does not need to be disassembled to move the biasing members 170 when changing the orientation of the static part 110 with respect to the steerer, which increases convenience to the user.

The first extensions 152a have edges 156a that are inclined with respect to the second extensions 152b such that the first extensions 152a have a height above or below the second extensions 152b that decreases when moving away from the static part 110. The edges 156a may determine the range of movement of the suspended part 120 by interacting with the inner surface 125 of the body 121 of the suspended part 120. For example, in the neutral position, the inner surface 125 of the body 121 and the edge 156a of the bottom first extension 152a may interact to prevent further rotation of the suspended part 120 in the direction of the top of the body 121 according to the biasing member 170. In the rotated state, the edge 156a of the top first extension 152a and the inner surface 125 of the body 121 may interact to limit rotation of the suspended part 120 about the pivot 140. The second extensions 152b have edges 156b that are generally parallel to each other to decrease or limit lateral movement of the body 121 of the suspended part 120.

In embodiments, the static part 110 need not include the first extensions 152a. In such configuration, the biasing member 170 may include only one biasing member disposed between the second extensions 152b and the top of the inner surface 125 of the body 121 of the suspended part 120. The range of motion of the suspended part 120 may be limited by at least one of interactions of the first curve 122a of the curved end 122 of the body 121 of the suspended part 120 and the static part 110, compression of the biasing member 170, and interaction of the protrusion portion 150 and the inner surface 125 of the body 121 of the suspended part 120. Another biasing member 170 may be disposed between the second extensions 152b and the bottom of the inner surface 125 of the body 121 of the suspended part 120 to limit and/or damp movement of the suspended part 120.

Figure 4:
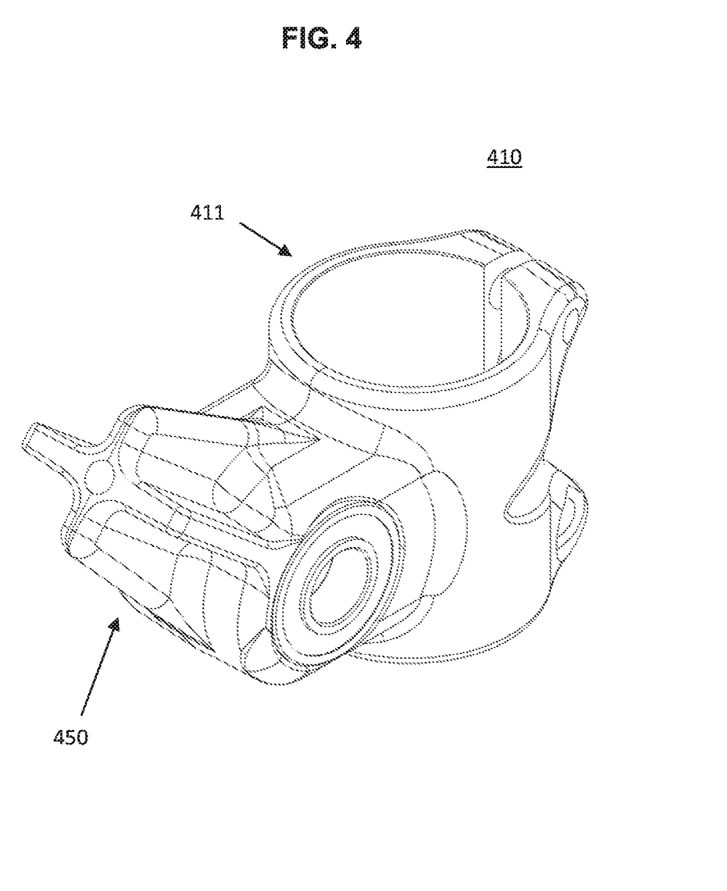
FIG. 4 shows a perspective view of a static part of a suspension stem according to aspects of the invention.

As shown in FIG. 3, the long axis direction of the protrusion portion 150 extends from the connection portion 111 at an angle of +6° from a direction perpendicular to the axis of rotation of the steerer of the fork. The static part 110 as shown in FIG. 3 may be connected to the steerer of the fork to provide ±6° of rise. However, the protrusion portion 150 may extend at a different angle to provide for increased comfort for a rider. FIG. 4 shows a perspective view of a static part of a suspension stem according to aspects of the invention. In FIG. 4, the static part 410 includes a connection portion 411 and a protrusion portion 450. A long axis of the protrusion portion 450 forms an angle with the direction perpendicular to the axis of rotation of the steerer of the fork disposed in connection portion 411 of the static part 410. As shown in FIG. 4, the angle may be +30°. As described herein, the static part 410 may be flipped to provide a −30° angle with respect to the direction perpendicular to the axis of rotation of the steerer of the fork disposed in connection portion 411 of the static part 410.

Figure 9:
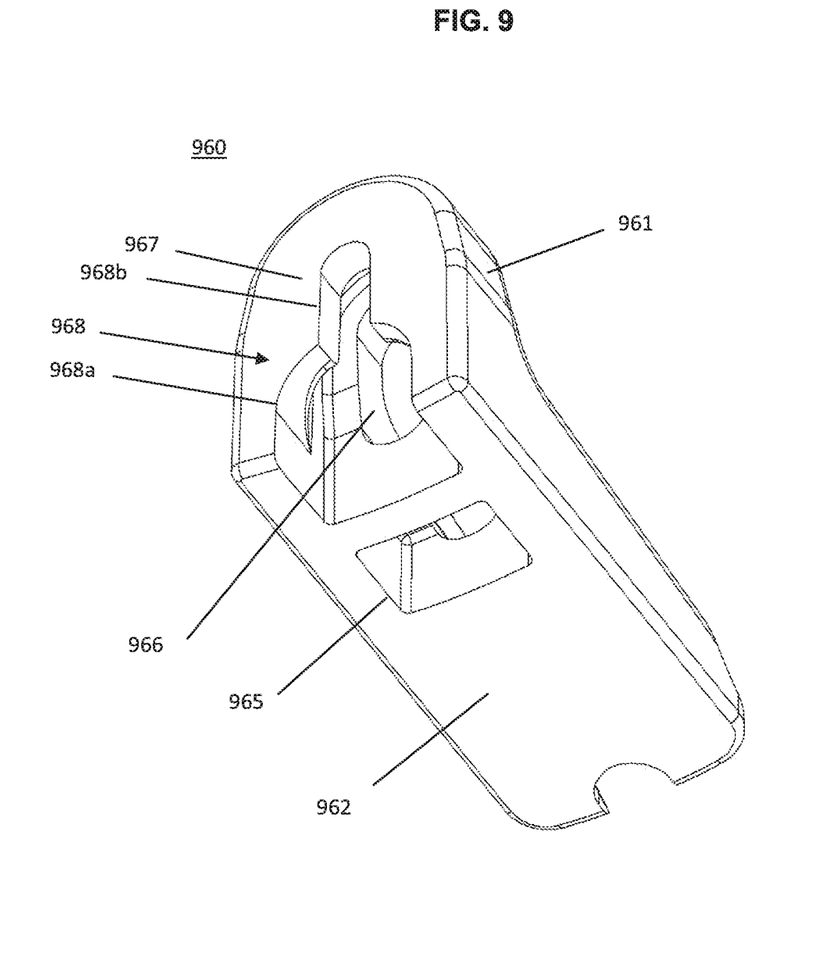
FIG. 9 shows a bottom perspective view of a wedge according to aspects of the invention.
Figure 10:
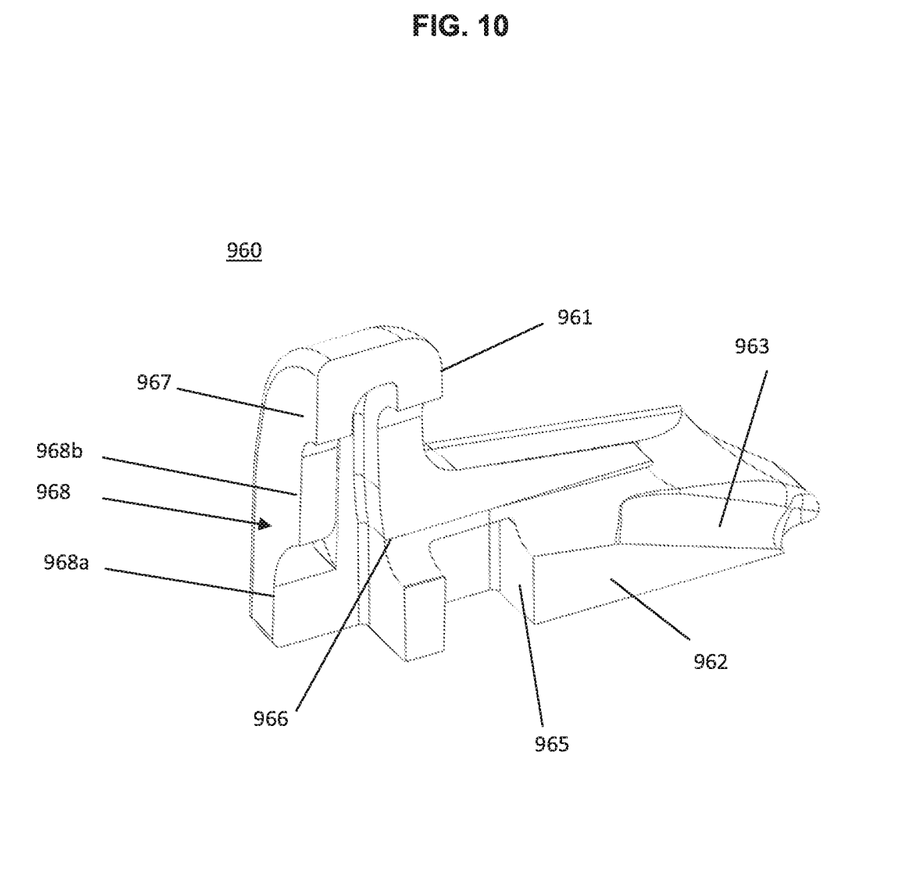
FIG. 10 shows a cross-sectional view of a wedge according to aspects of the invention.

FIG. 9 shows a bottom perspective view of a wedge according to aspects of the invention. FIG. 10 shows a cross-sectional view of a wedge according to aspects of the invention. A wedge 960 includes a main portion 961 and a leg portion 962. The main portion 961 includes a throughhole 966 and a hood portion 967 having a slot 968. With reference to FIGS. 2, 9, and 10, a fastener, for example, fastener 126 of FIG. 2, may be inserted into the throughhole 966 to extend through the throughhole 966 to engage with tapped hole 116 of the protrusion portion 150 to secure the wedge part 160 to the protrusion portion 150 and to secure the biasing member 170 in place between the protrusion portion 150 and the inner surface 125 of the body 121 of the suspended part 120. The hood 967 of the main portion 961 provides the slot 968, and the slot 968 includes a wide portion 968a and a narrow portion 968b. The wide portion 968b of the slot 968 accommodates a head of the fastener 126 upon insertion into the throughhole 966. The head of the fastener 126 is insertable under the hood 967. The narrow portion 968b is wide enough to accept a tool for operation of the fastener 126 but narrow enough to allow the head of the fastener 126 to push against the hood 967 upon removal of the fastener 126 from the tapped hole 116 to back the wedge 960 off of the protrusion portion 150.

The leg portion 962 extends generally at a right angle from the main portion 961 and includes a throughhole 965. The leg portion 962 may include one or more legs. A rebound biasing member may be inserted into the throughhole 965 of the leg portion 962 of the wedge 960 and may be biased between the inner surface 125 of the body 121 of the suspended part 120 and the protrusion portion 150. For example, an edge 156a of the bottom first extension 152 may be accepted upon curved section 963 of the wedge 960 to bias the rebound biasing member inserted into the throughhole 965 to resist rotation of the suspended part 120 about the pivot 140 from the rotated position of FIG. 6 to the neutral position of FIG. 5. The rebound biasing member may be similar to the biasing member 170 as described herein and may be any material or feature capable of providing a force that varies with displacement, including elastomers, for example, polyurethane based elastomers, wire springs, magnets, pistons, air bladders, and the like. The rebound biasing member may be shaped to fit into and/or be held in the throughhole 965 of the leg portion by friction and may have an irregular shape to present different usable volumes thereby changing the effective stiffness of the rebound biasing member. The rebound biasing member provides for increased control of the movement of the suspended part 120 from the rotated position to the neutral position to provide increased comfort for a rider.

Figure 5:
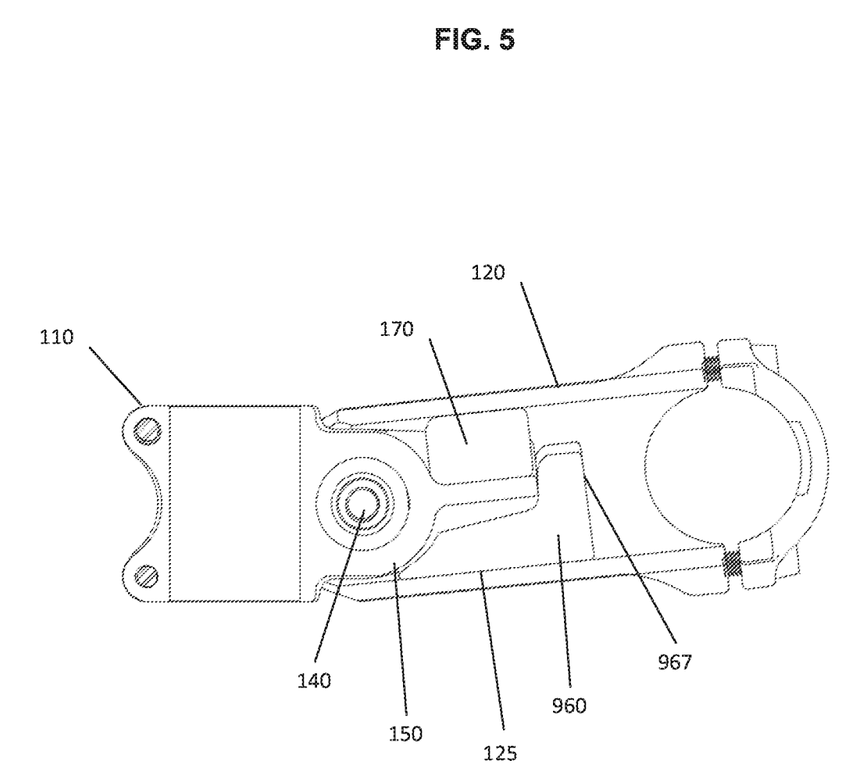
FIG. 5 shows a cross-sectional view of a suspension stem according to aspects of the invention in a neutral state.
Figure 6:
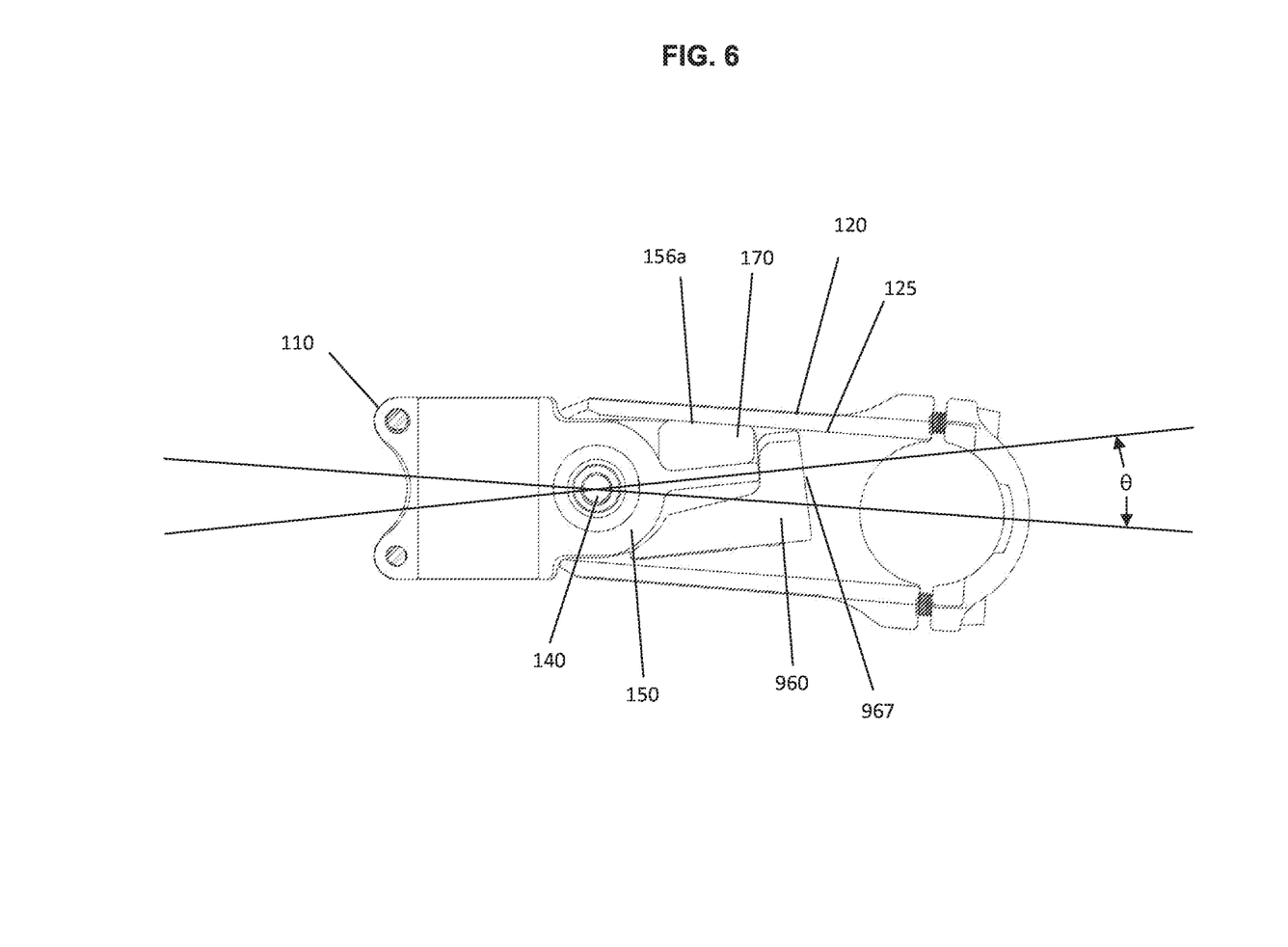
FIG. 6 shows a cross-sectional view of a suspension stem according to aspects of the invention in a rotated state.

FIG. 5 shows a cross-sectional view of a suspension stem according to aspects of the invention in a neutral state. FIG. 6 shows a cross-sectional view of a suspension stem according to aspects of the invention in a rotated state. The views in FIGS. 5 and 6 are taken along a long axis direction of the protrusion portion 150 and the long axis of the suspended part 120 through a biasing member 170 to illustrate the rotation of the suspended body 120 and the action of the biasing member 170. In FIG. 5, the biasing member 170 is disposed between the protrusion portion 150 and the inner surface 125 of the body 121 of the suspended part 120 to bias the suspended part 120 toward a top of the suspended part 120, or counter clockwise as shown in FIG. 5. The wedge 960 is secured to the protrusion portion 150 via fastener 126 disposed within the hood 967 as described with respect to FIGS. 9 and 10 and secures the biasing member 170 between the protrusion portion 150 and the body 121 of the suspended part 120. The wedge 960 may secure the biasing member 170 by at least partially actuating the biasing member 170 between the protrusion portion 150 and the body 121 of the suspended part 120 by rotating the suspended part 120 about the pivot 140 with respect to the static part 110. As shown in FIG. 5, the wedge 960 and the bottom of the inner surface 125 of the suspended part 120 interact to limit rotation of the suspended part 120 toward a top of the suspended part 120 (counter clockwise in FIG. 5) and to at least partially actuate the biasing member 170.

FIG. 6 shows the suspended part 120 in a rotated position in which the suspended part 120 has rotated through an angle θ with respect to the static part 110. More specifically, the long axis of the suspended part 120 has been rotated through the angle θ with respect to the long axis direction of the protrusion portion 150. The inner surface 125 of the body 121 of the suspended part 120 and the edge 156a of the protrusion portion 150 interact to prevent further movement of the suspended part 120 with respect to the static part 110. During rotation between the neutral position of FIG. 5 and the rotated position of FIG. 6, the biasing member 170 is actuated, for example, compressed, and controls the speed of rotation of the suspended part 120.

Although FIGS. 5 and 6 show the rotation of the suspended part 120 with respect to the static part 110 being limited by the wedge 960 and the top edge 156a of the protrusion portion 150, the rotation may be limited by other configurations. For example, the biasing member 170 and/or the curved end 122 of the suspended part 120 may stop movement of the suspended part 120 as described herein. Although FIGS. 5 and 6 are described with respect to wedge 960, wedge 160 may equally be applied.

Figure 7:
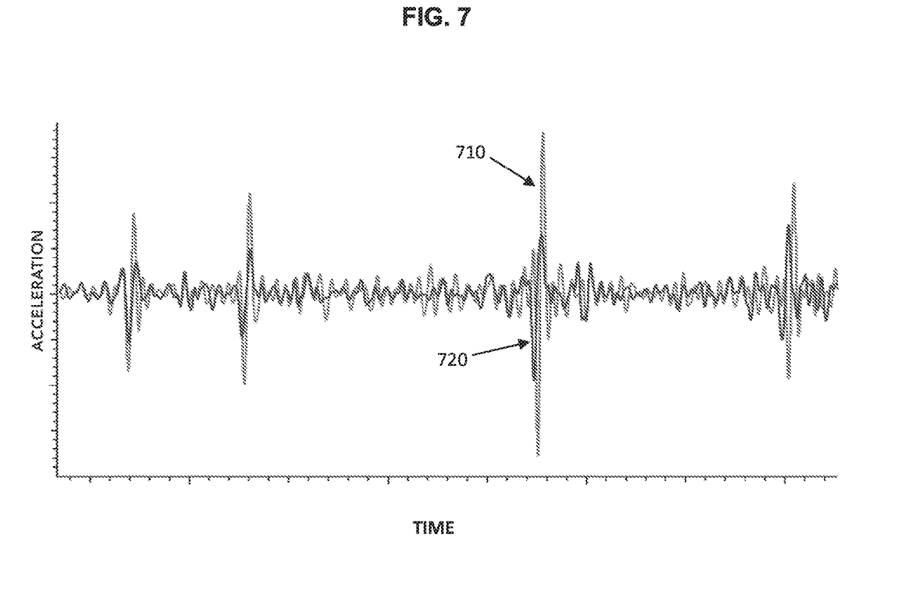
FIG. 7 shows results of an impact test of a rigid stem and a suspension stem according to aspects of the invention.

FIG. 7 shows results of an impact test of a rigid stem and a suspension stem according to aspects of the invention. Measurements of acceleration at the handlebar of a conventional rigid stem are indicated by curve 710, and measurements of acceleration at the handlebar of the suspension stem according to aspects of the invention are indicated by curve 720. When subjected to the same impacts, as shown in FIG. 7, the suspension stem according to aspects of the invention may substantially reduce transfer of the impact to the handlebars by, for example, 70%, which can increase rider comfort and decrease risks for injury.

Figure 8:
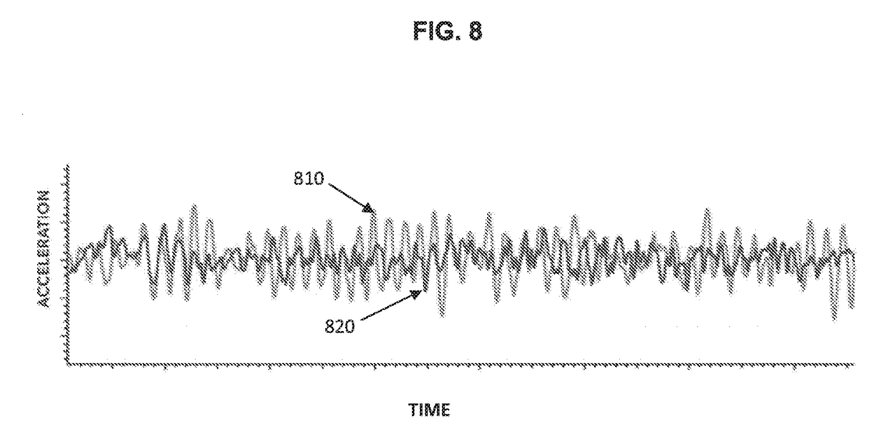
FIG. 8 shows results of an acceleration test of a rigid stem and a suspension stem according to aspects of the invention.

FIG. 8 shows results of an acceleration test of a rigid stem and a suspension stem according to aspects of the invention. Measurements of acceleration at the handlebar of a conventional rigid stem are indicated by curve 810, and measurements of acceleration at the handlebar of the suspension stem according to aspects of the invention are indicated by curve 820. FIG. 8 shows a comparison of what is commonly referred to as road chatter, the comparison being between the suspension stem according aspects of the invention and a conventional rigid stem. And, when subjected to the same surface, as shown in FIG. 8, the suspension stem according to aspects of the invention may substantially reduce transfer of road chatter to the handlebar, which can increase rider comfort and decrease risks for injury.

As described herein, according to aspects, the suspension stem according to aspects of the invention includes an integrated pivot joint and an integrated spring or biasing element. The integrated pivot allows the stem to be built within the enveloping dimensions of a typical rigid (i.e. non-suspended) threadless bicycle stem, for example, overall stem width and height, steerer tube clamp height, and handlebar clamp width. Further, the suspension stem according to aspects may have numerous accessory mounting features including holes with screw threads for attaching lights, bike computers, cell phones, other devices with screens, and/or an insert plate with additional mounting features installed between the faceplate 130 and the handlebar and retained by the clamping force of the faceplate 130.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, although described herein with respect to bicycles, aspects of the invention are not limited thereto such that any shock or impact absorption device may utilize the features described herein. For example, motorcycles, construction equipment, machinery, lawn mowing equipment, sanders, handles and railings, and the like. And, aspects may be implemented in plural, for example, a handle or railing on a bus or subway may be connected to a wall by connections each implementing aspects of the invention.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A bicycle suspension stem mountable between a steerer tube of a fork and a handlebar to secure the handlebar to a bicycle, the bicycle suspension stem comprising:
   a static part configured to connect to a steerer of a bicycle fork, the static part comprising a connection portion and a protrusion portion having an end disposed away from the connection portion;
   a suspended part rotatably connected to the static part and configured to connect to a handlebar;
   a biasing member disposed between the protrusion portion and an inside surface of the suspended part to resist rotation of the suspended part about an axis of rotation; and
   a wedge connected to said end of the protrusion portion to secure the biasing member between the protrusion and the inside surface of the suspended part and to limit rotational movement of the suspended part.

2. The bicycle suspension stem of claim 1, wherein the wedge preloads the biasing member between the protrusion and the inside surface of the suspended part.

3. The bicycle suspension stem of claim 1, wherein the rotation of the suspended part is limited in a neutral position by at least one of the protrusion portion, the wedge, a curved end of the suspended part, and the biasing member.

4. The bicycle suspension stem of claim 1, wherein the rotation of the suspended part is limited in a rotated position by at least one of the protrusion portion, the wedge, a curved end of the suspended part, the biasing member.

5. The bicycle suspension stem of claim 1, wherein the biasing member is a urethane based elastomer.

6. The bicycle suspension stem of claim 1, wherein the protrusion portion comprises an elongated cross shape that extends into the suspended part.

7. The bicycle suspension stem of claim 1, wherein the protrusion portion extends from the static part at an angle relative to a direction perpendicular to an axis of rotation of the steerer.

8. The bicycle suspension stem of claim 1, wherein the protrusion portion comprises a throughhole in which at least one rotation member is disposed.

9. The bicycle suspension stem of claim 1, further comprising a second biasing member disposed between the protrusion portion and the inside surface of the suspended part to resist rotation of the suspended part about the axis of rotation opposite to the resistance of the biasing member.

10. A bicycle suspension stem mountable between a steerer tube of a fork and a handlebar to secure the handlebar to a bicycle, the bicycle suspension stem comprising:
    a static part configured to connect to a steerer of a bicycle fork, the static part comprising a connection portion and a protrusion portion having an end disposed away from the connection portion;
    a suspended part rotatably connected by a single pivot to the static part and configured to connect to a handlebar, the single pivot being between the connection to the handlebar and the connection of the static part to the steerer;
    a biasing member disposed between the protrusion portion and the inside surface of the suspended part; and
    a wedge connected to said end of the protrusion portion to secure the biasing member between the protrusion portion and the inside surface of the suspended part.

11. The bicycle suspension stem of claim 10, wherein the single pivot is closer to the connection of the static part to the steerer than the connection of the suspended part to the handlebar.

12. The bicycle suspension stem of claim 10 wherein the wedge preloads the biasing member between the protrusion and the inside surface of the suspended part.

13. The bicycle suspension stem of claim 10, further comprising a second biasing member disposed opposite the protrusion portion from the biasing member to resist rebound rotation of the suspended part.

14. A The bicycle suspension stem of claim 10, wherein the protrusion portion is enclosed in the suspended part.

15. The bicycle suspension stem of claim 10, wherein the biasing member is enclosed in the suspended part.

* * * * *